Feb. 28, 1928.
B. W. McCLYMONT ET AL
1,661,002
COMBINED FILLER AND DRAINER
Filed Jan. 11, 1926
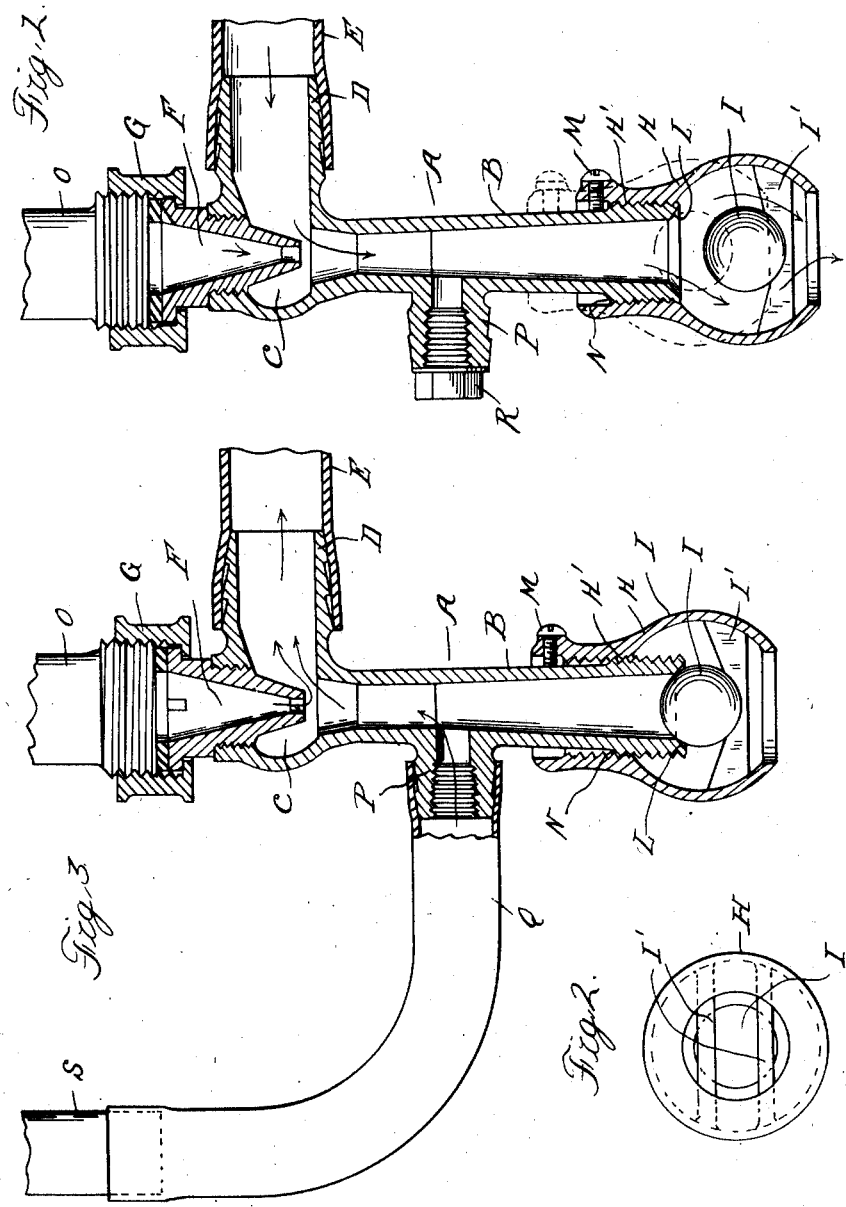
Inventors
Bryce W. McClymont
Howard D. Yoder
By Whittemore Hulbert Whittemore Belknap
Attorneys Patented Feb. 28, 1928.

1,661,002

UNITED STATES PATENT OFFICE.

BRYCE W. McCLYMONT AND HOWARD D. YODER, OF DETROIT, MICHIGAN, ASSIGNORS TO PENBERTHY INJECTOR COMPANY, OF DETROIT, MICHIGAN, A CORPORATION OF MICHIGAN.

COMBINED FILLER AND DRAINER.

Application filed January 11, 1926. Serial No. 80,626.

The invention relates to attachments to water faucets by means of which receptacles not in registration therewith or directly connected to the drain may be either filled or emptied.

It is one of the objects of the invention to obtain a construction which when used as an ejector will more readily prime itself.

It is a further object to adapt the construction for use with either separate cold and hot water faucets or with combination cold and hot water faucets.

It is a still further object to obtain a self contained construction normally operable without the necessity of attaching or detaching parts. With these objects in view the invention consists in the construction as hereinafter set forth.

In the drawings;

Figure 1 is a central longitudinal section of our device.

Figure 2 is a bottom plan view thereof.

Figure 3 is a view similar to Figure 1 showing the device in use with separate hot and cold water taps.

A is a casing which has a portion B thereof in the form of an oppositely flared tube with a chamber C at its inlet end connecting with a nipple D for the attachment of a flexible hose E. F is a tapered nozzle which has a threaded engagement with the ends of the casing A and is arranged in axial alignment with the tube B. G is a threaded coupling having a swivel engagement with the nozzle F and adapted to attach the fitting to a water faucet.

The opposite or discharge end of the tube B has attached thereto a sleeve H preferably of a segmental spherical form and within which is arranged a ball or spreader member I. This ball or spreader is retained within the segmental spherical member H by resting on cross bars I' which are depressed to centralize the ball within the chamber. The member H is also longitudinally adjustable upon the member A preferably by threading the lower end of the latter as indicated at H' and correspondingly internally threading the member H. This permits of an adjustment which will press the ball I against a conical seat L at the lower end of the member A so as to form a shut-off valve. On the other hand the member H is capable of adjusting downward to open a free passage for the liquid around the ball and to prevent complete detachment a set screw M is arranged to engage a shoulder N at the upper end of the threaded portion.

With the construction as thus far described assuming that the fitting is connected by the coupling G to a combined hot and cold water tap and that the member H is in the position shown in Figure 1, it will be seen that either hot or cold water may be freely discharged from said fitting into the sink or other receptacle in registration therewith. On the other hand, if it is desired to fill the receptacle not in registration with the fitting, the member H may be screwed up upon its threaded bearing until the ball I engages the seat L whereupon the liquid will be forced through the nipple D and hose E to the receptacle to be filled. Finally if it is desired to eject water from a receptacle not connected with the drain and located either at a higher or a lower level than the fitting, the end of the hose E is inserted in said receptacle, the member H is screwed downward and water from the faucet is turned on. This, upon leaving the lower end of the casing A, will impinge against the ball I and will be spread to the surrounding walls of the member H thereby producing a seal which will prime the ejector and prevent the back-feeding of air.

To adapt the device for use in connection with separate hot and cold water faucets, the casing A is provided with a nipple P preferably located at or near the throat of the venturi in said casing. This nipple may be connected by a hose Q with the hot water faucet thereby permitting the mixing of hot and cold water in any desired proportion. Inasmuch, however, as the device is normally used with combined hot and cold water faucets, the nipple P is internally threaded to engage a plug R which normally closes the passage but this can be removed when necessary.

What we claim as our invention is:

1. A device for the purpose described comprising an enjector casing, means for coupling said casing to a water faucet, means on said casing for connecting a suction conduit thereto and a second connection on said casing for a conduit from another faucet, the said last mentioned connection being arranged between the suction conduit connection and the discharge end of the casing.

2. A device for the purpose described comprising an ejector casing, means for coupling said casing to a water faucet, means on the suction side of said ejector for coupling a suction conduit thereto, means on the discharge side of said ejector for coupling the same to a second faucet and means for closing said second connection.

3. A device for the purpose described comprising an ejector casing, means for coupling said casing to a water faucet, means for connecting a suction conduit to said casing, a tubular extension of said casing longitudinally adjustable thereon and a member loosely supported within said tubular extension alternatively functioning as a spreader and as a shut-off in different positions of adjustment of said tubular extension.

4. A device for the purpose described comprising an ejector casing, means for coupling said casing to a water faucet, nipples on said casing respectively on the suction and discharge sides thereof for coupling a suction conduit and a conduit from another faucet, a tubular extension of said casing longitudinally adjustable thereof, a ball within said tubular extension, means for supporting and centralizing said ball within said tubular casing whereby said ball will function alternatively as a spreader and as a shut off valve.

5. A device for the purpose described comprising an ejector casing, means for coupling said casing to a water faucet, nipples on said casing for respectively connecting the suction conduit and a conduit leading from another faucet, a removable plug for normally closing the latter nipple, a tubular extension of said casing threadedly adjustable thereon, a ball within said tubular extension and means for supporting and centralizing said ball within said tubular extension.

6. A device for the purpose described comprising an ejector casing, means for coupling said casing to a water faucet, nipples on said casing for connecting the same respectively to a suction conduit and a conduit for connection with another faucet, a tubular member adjustably threaded to said casing and having a hollow spherical extension, a ball within said extension and means for supporting and centralizing said ball within said hollow spherical portion.

7. A device for the purpose described comprising an ejector casing, a connection for coupling said casing to a water faucet, a second connection spaced from said first mentioned connection, longitudinally of the casing, for connecting said casing to a second faucet, a third connection spaced from both of the first mentioned connections and arranged between the same, longitudinally of the ejector casing, for connecting said casing with a suction conduit, and a discharge nozzle spaced from all three of the said connections for directing discharge from the casing.

8. A device for the purpose described comprising an elongated ejector casing, means at one end for coupling said casing to a water faucet, a nozzle at the opposite end for directing the discharge from the casing, and a pair of connections spaced longitudinally of the ejector casing between the inlet and the outlet ends thereof for connecting a suction conduit and a second faucet respectively to said casing, the said last mentioned connections being so arranged that water may be discharged from the second faucet connection and through the casing without creating a suction in the suction conduit.

In testimony whereof we affix our signatures.

BRYCE W. McCLYMONT.
HOWARD D. YODER.